(12) United States Patent
Ha et al.

(10) Patent No.: US 9,266,080 B2
(45) Date of Patent: Feb. 23, 2016

(54) REACTION DEVICE FOR PRODUCING HYDROCARBONS FROM SYNTHESIS GAS

(75) Inventors: Kyoung Su Ha, Gyeonggi-do (KR); Du Eil Kim, Seoul (KR); Gyu In Jung, Daejeon (KR); Jong Wook Bae, Daejeon (KR); Ki Won Jun, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 348 days.

(21) Appl. No.: 13/823,326

(22) PCT Filed: Jul. 19, 2011

(86) PCT No.: PCT/KR2011/005300
§ 371 (c)(1),
(2), (4) Date: Mar. 14, 2013

(87) PCT Pub. No.: WO2012/036377
PCT Pub. Date: Mar. 22, 2012

(65) Prior Publication Data
US 2013/0171040 A1     Jul. 4, 2013

(30) Foreign Application Priority Data
Sep. 17, 2010 (KR) .................. 10-2010-0091348

(51) Int. Cl.
*B01J 8/22*     (2006.01)
*C10G 2/00*     (2006.01)
*B01J 8/00*     (2006.01)

(52) U.S. Cl.
CPC ............ *B01J 8/0085* (2013.01); *B01J 8/006* (2013.01); *B01J 8/22* (2013.01); *B01J 8/226* (2013.01);
(Continued)

(58) Field of Classification Search
None
See application file for complete search history.

(56) References Cited

U.S. PATENT DOCUMENTS

| 4,605,678 A | 8/1986 | Brennan et al. |
| 4,919,792 A | 4/1990 | Huh et al. |

(Continued)

FOREIGN PATENT DOCUMENTS

| CN | 1235142 A | 11/1999 |
| CN | 101391196 | 3/2009 |

(Continued)

OTHER PUBLICATIONS

Chinese office action dated Jul. 23, 2014 for Application No. 201180044543.8.
(Continued)

*Primary Examiner* — Jennifer A Leung
(74) *Attorney, Agent, or Firm* — Fleit Gibbons Gutman Bongini & Bianco, PL; Paul D. Bianco

(57) ABSTRACT

Disclosed is a reaction device for producing hydrocarbons from synthesis gas, in which hydrocarbons, olefins, oxygenates, etc., are produced over a Fischer-Tropsch catalyst by using synthesis gas, so that the catalyst particles can easily be from a slurry which is discharged to the outside. That is, the present invention provides a reaction device for producing hydrocarbons from synthesis gas, in which an internal filter system for separating particles enlarged due to agglomeration phenomenon of a catalyst is installed inside the reactor, and a separating device is separately disposed outside, such that it is possible to recirculate only particles having a size appropriate for performing F-T synthesis in the slurry phase, and additionally, it is possible to effectively discharge and process a catalyst aggregated due to a combination of fine catalyst particles, the catalyst chipped off during the operation, etc., liquid hydrocarbon, resulting water, etc., in the slurry phase reactor.

19 Claims, 11 Drawing Sheets

(52) U.S. Cl.
CPC . *B01J 8/228* (2013.01); *C10G 2/32* (2013.01); *C10G 2/342* (2013.01); *B01J 2208/00902* (2013.01); *B01J 2208/00929* (2013.01); *B01J 2208/00938* (2013.01); *C10G 2300/1022* (2013.01)

(56) References Cited

U.S. PATENT DOCUMENTS

| | | | |
|---|---|---|---|
| 5,599,849 | A | 2/1997 | Jager et al. |
| 5,844,006 | A | 12/1998 | Jager |
| 5,900,159 | A | 5/1999 | Engel et al. |
| 5,939,350 | A * | 8/1999 | Singleton et al. ............. 502/230 |
| 5,977,192 | A | 11/1999 | Howsmon et al. |
| 6,096,789 | A | 8/2000 | Clerici et al. |
| 6,462,098 | B1 | 10/2002 | Vogel et al. |
| 6,929,754 | B2 | 8/2005 | Espinoza et al. |
| 6,974,842 | B1 | 12/2005 | Spena et al. |
| 7,008,966 | B2 | 3/2006 | Degeorge et al. |
| 7,098,251 | B2 | 8/2006 | Clerici et al. |
| 7,431,824 | B2 | 10/2008 | Chen et al. |
| 7,972,499 | B2 | 7/2011 | Chen |
| 8,183,301 | B2 | 5/2012 | Oh et al. |
| 2002/0035163 | A1 | 3/2002 | Vogel et al. |
| 2003/0232894 | A1 * | 12/2003 | Mohedas et al. ............. 518/726 |
| 2005/0000861 | A1 | 1/2005 | Clerici et al. |
| 2006/0054533 | A1 | 3/2006 | Chen et al. |
| 2011/0028574 | A1 | 2/2011 | Woo et al. |
| 2011/0178186 | A1 | 7/2011 | Oh et al. |

FOREIGN PATENT DOCUMENTS

| | | |
|---|---|---|
| JP | 2006-022283 | 2/2006 |
| KR | 20090093249 A | 9/2009 |
| KR | 20080094225 A | 4/2010 |
| KR | 20100034970 A | 4/2010 |
| WO | WO 9416807 A1 * | 8/1994 |
| WO | 9731693 A1 | 9/1997 |
| WO | 2006031571 A2 | 3/2006 |
| WO | 2009/107927 A1 | 9/2009 |

OTHER PUBLICATIONS

International Search Report (ISR) published May 3, 2012 for International Patent Application No. PCT/KR2011/005300.

Written Opinion dated Mar. 27, 2012 for International Patent Application No. PCT/KR2011/005300.

Eng. transiation of International Preliminary Report on Patentability for PCT/KR11/005300 dated Mar. 19, 2013.

White, C.M., et al. "Separation of Fischer-Tropsch Catalyst/Wax Mixtures Using Dense-Gas and Liquid Extraction", Energy and Fuels, 1996. vol. 10, No. 5, pp. 1067-1073.

* cited by examiner

REACTION DEVICE FOR PRODUCING HYDROCARBONS FROM SYNTHESIS GAS

TECHNICAL FIELD

The present invention relates to a reaction device for producing hydrocarbons from synthesis gas, and more particularly, to a reaction device for producing hydrocarbons from synthesis gas, in which hydrocarbons, olefins, oxygenates, and the like are produced over a Fischer-Tropsch catalyst by using synthesis gas, in such a way that catalyst particles can easily be from a slurry which is discharged to the outside.

BACKGROUND ART

By the F-T synthesis method developed by Fischer and Tropsch, who are German chemists in 1923, it is possible to produce liquid hydrocarbon from coal, natural gas, biomass, and the like through synthesis gas. A process of producing liquid hydrocarbon from coal is referred to as a coal-to-liquids (CTL) process, a process of producing liquid hydrocarbon from natural gas is referred to as a gas-to-liquids (GTL) process, and a process of producing liquid hydrocarbon from biomass is referred to as a biomass-to-liquids (BTL) process, and similar processes are collectively referred to as an XTL process recently. The processes first change each source material (coal, natural gas, biomass, and the like) to synthesis gas by using a gasification method, a reforming method, and the like. For a composition of synthesis gas appropriate to the XTL process for producing liquid fuels, a ratio of hydrogen to carbon monoxide may be approximately 2 as represented in an equation below.

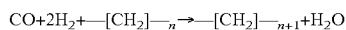

$$CO+2H_2+\text{---}[CH_2]\text{---}_n \rightarrow \text{---}[CH_2]\text{---}_{n+1}+H_2O$$

CO, H2, $\text{---}[CH_2]\text{---}_n$, $H_2O$ represent carbon monoxide, hydrogen, hydrocarbon having a chain length of n (n carbon atoms), and water, respectively. However, when a ratio of hydrogen is high, selectivity of methane is increased, so that selectivity of $C_5+$ (hydrocarbon with 5 carbon atoms or more) is relatively decreased, the high ratio of the hydrogen is not appropriate. Olefin, oxygenate (molecule containing atomic oxygen, such as alcohol, aldehyde, and ketone), and the like, as well as hydrocarbon having a linear chain with the aforementioned form, are generated as a by-product.

Since one of the main purposes of the XTL process is to obtain liquid fuel, it is a recent trend to produce linear hydrocarbon, especially, linear hydrocarbon with $C_5+$, with high selectivity by optimizing a cobalt-based catalyst, a ratio, temperature, pressure of synthesis gas, and the like. An iron-based catalyst is the most widely used catalyst, other than the cobalt-based catalyst. The iron-based catalyst is mainly used in the early days, and is cheaper than the cobalt-based catalyst, has low methane selectivity at a high temperature, and has high olefin selectivity among hydrocarbon, and many products based on olefin, other than liquid fuels, are generated. Compared to this, the cobalt catalyst mainly generates liquid fuels, generates less carbon dioxide, and has a long life span. However, the cobalt catalyst is very high in price than iron, methane selectivity thereof is increased, so that the cobalt catalyst needs to be reacted at a low temperature, and the cobalt catalyst is high in price, so that it is necessary to use the cobalt catalyst by distributing well a small amount of cobalt catalyst on a surface of a support. Refractory oxide materials such as alumina, silica, titania, and the like are used as the support, and performance thereof is improved by using noble metal, such as Ru, pt, and Re, as a cocatalyst.

A form of the reactor considered up to now is classified into a tubular fixed bed reactor, a fluidized bed reactor, and slurry phase reactor, and the representative fluidized bed reactors are a circulating fluidized bed reactor and a fixed fluidized bed reactor. Since a reaction characteristic and distribution of a product are influenced according to the form of the reactor, the form of the reactor needs to be appropriately selected considering a target final product.

As far as commercialization is concerned, the fluidized bed reactor among the reactors is mainly operated at a high temperature, and a main component of the final product is gasoline, and light olefin. The tubular fixed bed reactor and the slurry phase reactor are mainly appropriate for producing diesel, lube base oil, wax, and the like, and are commercially operated by a low-temperature F-T process. In the low-temperature F-T process, hydrocarbon of 60% or more having a higher boiling point than that of diesel is generated, so that diesel is additionally produced through a subsequent process, such as hydrocracking, and a wax component is changed to high-quality lube base oil through a dewaxing process to be used. In comparison between the fixed bed reactor and the slurry phase reactor representative in the low-temperature F-T reaction, the slurry phase reactor has advantages as follows.

An apparatus expense and a construction expense are low.
Heat and material transfer efficiencies are high.
Axis-directional pressure drop is small.
Productivity (productivity per volume of the reactor) is high.
It is easy to charge catalyst particles, and it is possible to additionally charge and discharge the catalyst during an operation.

In respect to the aforementioned advantages, the slurry phase reactor has been preferred, but the product is mixed with catalyst particles to be obtained as a slurry phase, so that a method of effectively separating the liquid hydrocarbon from the catalyst particles is demanded. In this respect, a filtration method, a centrifugation method, a magnetic separation method, a separation method using hydrocyclone are widely known as a representative method.

Reviewing the filtration method, a filtration apparatus may be divided into an internal filtration apparatus and an external filtration apparatus according to an installation position of the filtration apparatus. U.S. Pat. Nos. 6,462,098 and 7,098,251 disclose an example in which a filtration apparatus is installed inside a slurry phase reactor, and U.S. Pat. No. 7,008,966 represents a conceived example in which a filtration apparatus installed inside may be removed, and U.S. Pat. No. 6,929,754 discloses an example in which filtering performance is improved by installing a filtration apparatus outside a reactor and adjusting a filter cake. Further, a magnetic separation method, which needs high-priced equipment but has excellent separation performance for an iron catalyst, has been attempted (Energy & Fuels, Vol. 10, No. 5, 1996). U.S. Pat. Nos. 4,919,792 and 6,974,842 describe that a centrifugal separator may be applied to separation of a catalyst from slurry, and above this, various catalyst separation methods have been reported in many patents and documents.

As described above, various catalyst particle separation methods have been disclosed, but there is a limit in that the catalyst is separated only by the filtration method because fine catalyst particles or fragmented catalyst particles during a slurry reaction block fine filter holes. Further, there is a disadvantage in that the centrifugal separator has a burden in operating a rotation device, and a sedimentation method takes a long time. The magnetic separation method is an effective method, but is very high in price and an applicable catalyst is limited to a few kinds of catalysts.

One of the most important issues which should not be overlooked in the catalyst particle separation method is a catalyst agglomeration phenomenon. The catalyst agglomeration phenomenon refers to a phenomenon in which fine catalyst particles or small fragmented particles during the reaction are tangled with each other together with liquid hydrocarbon, co-produced water, and the like to be agglomerated.

Various attempts and researches have been reported due to the catalyst agglomeration phenomenon, and according to Korean Patent Application Publication No. 2010-0034970, it is described that the agglomeration phenomenon may be considerably solved by adding alcohol having a high boiling point, which is greatly helpful to improve long-time operation stability of the catalyst and extend a life span of the catalyst. Further, according to the U.S. Pat. No. 5,977,192, a problem was found in that a agglomeration phenomenon is generated due to a contact with liquid hydrocarbon when fine catalyst particles with less than 20 μm are injected to the reactor so that the catalyst particles are not distributed well inside the reactor, and process performance was improved by adding alcohol, ketone, ester, ether, or a mixture thereof, which is liquid polar oxygenate, not acidic.

A method of suppressing agglomeration by adding an additional additive like the aforementioned methods is highly preventive to be helpful for a fundamental solution, but the fact is obvious that the catalyst is fragmented due to accumulation of catalyst fatigue caused by a long-time operation or it is impossible to completely prevent fine catalyst particles, which are inevitably inserted at a predetermined portion when an additional catalyst is injected, from being aggregated. In addition, it is necessary to consider increase in an expense and other additional problems generated by injecting an additional compound during the process, and the large amount of expense is caused by separating and refining a tiny amount of compound even though the alcohol with the high boiling point or the polar oxygenate is replaced with similar kinds of by-products co-produced during a producing process.

Accordingly, a new reactor and separation method capable of removing agglomerated or aggregated catalyst lumps is demanded.

DETAILED DESCRIPTION OF THE INVENTION

Technical Problem

The present invention is a result researched in order to solve a agglomeration phenomenon of the catalyst particles, which occurs in the slurry phase reactor and the catalyst separation method using the same in the related art, and an object thereof is to provide a reaction device for producing hydrocarbons from synthesis gas, in which an internal filter system for separating enlarged catalyst lumps due to the agglomeration is installed inside the reactor, and a separating device is separately disposed outside, such that it is possible to recirculate only particles having a size appropriate for performing F-T synthesis in the slurry phase, and additionally, it is possible to effectively discharge and process catalyst lumps aggregated due to a combination of fine catalyst particles, the fragmented catalyst particles, and the like with liquid hydrocarbon, co-produced water, and the like in the slurry phase reactor.

Technical Solution

In order to achieve the aforementioned objectives, the present invention provides a reaction device for producing hydrocarbons from synthesis gas which includes a reactor for reacting synthesis gas over a Fischer-Tropsch catalyst and a synthesis gas distributor installed at a lower end side inside the reactor to distribute synthesis gas, the reaction device including: an internal filter installed at a lower end inside the reactor; a lower separating device connected with a lower outlet formed at a bottom side of the reactor to filter or separate slurry including a catalyst lump; an upper separating device connected with an upper outlet formed at a predetermined position at an upper side of the reactor to filter or separate slurry mixed with a fine catalyst; a gas discharge means configured to discharge non-reacted gas inside the reactor; and a recirculation discharge means configured to recirculate or discharge the catalyst filtered in the upper and lower separating devices.

Advantageous Effects

Through the aforementioned technical solutions, the present invention provides the effects below.

According to the present invention, it is possible to recirculate only the particles having a size appropriate for performing the F-T synthesis in the slurry phase to the reactor and it is possible to solve an internally generable agglomeration phenomenon of the catalyst particles by installing the internal filter for separating enlarged particles due to the agglomeration phenomenon of the catalyst particles inside the reactor and separately disposing a separating device outside, thereby more stably promoting XTL (CTL, GTL, BTL, and the like) technology development and product production.

BEST MODE

Hereinafter, an exemplary embodiment of the present invention will be described in detail with reference to the accompanying drawings.

The present invention is focused on maintaining performance of a reaction device for easily producing hydrocarbons from synthesis gas by effectively discharging catalyst lumps in which fine catalyst particles, fragmented catalyst particles generated during an operation or the like in a slurry phase reactor combine with liquid hydrocarbon, co-produced water, and the like to be aggregated.

That is, the present invention is to provide a new reaction device in which a lower structure within a reactor is improved and an external separating device is disposed in order to easily remove an aggregated or fragmented catalyst particles within a slurry bubble column reactor (SBCR) for producing gaseous or liquid hydrocarbon by using Fischer-Tropsch synthesis.

A reaction device for this according to each exemplary embodiment of the present invention will be described below.

Figure 1:
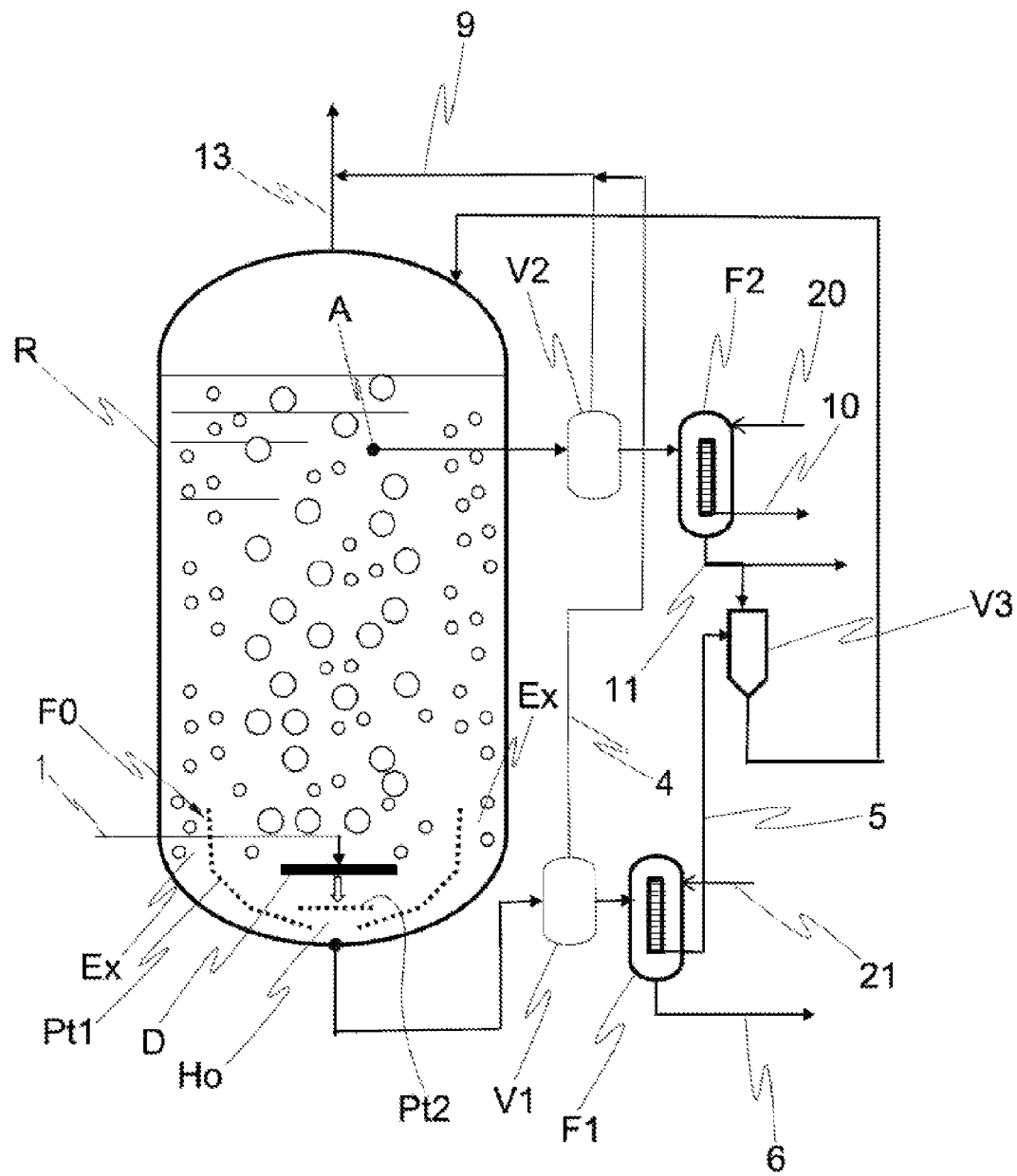
FIG. 1 is a view illustrating installation of an internal filter F0 and external separating devices F1 and F2 inside a slurry phase reactor R1 according to a first exemplary embodiment of the present invention.
Figure 2:
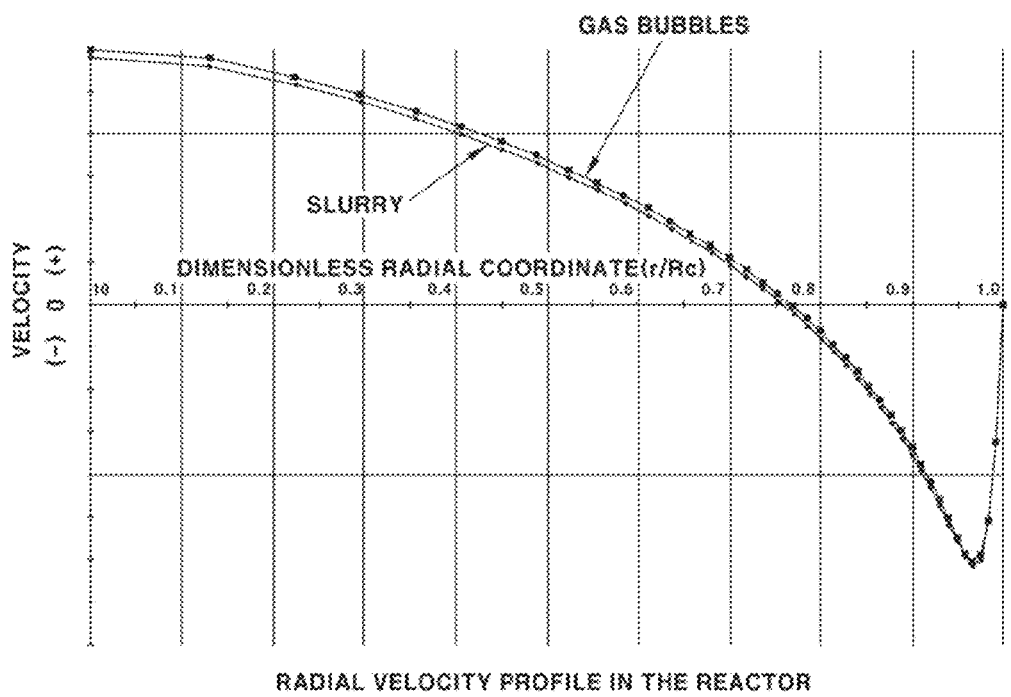
FIG. 2 is a graph illustrating a result of a simulation regarding a velocity of gas bubbles and slurry inside a slurry phase reactor according to the present invention.
Figure 3:
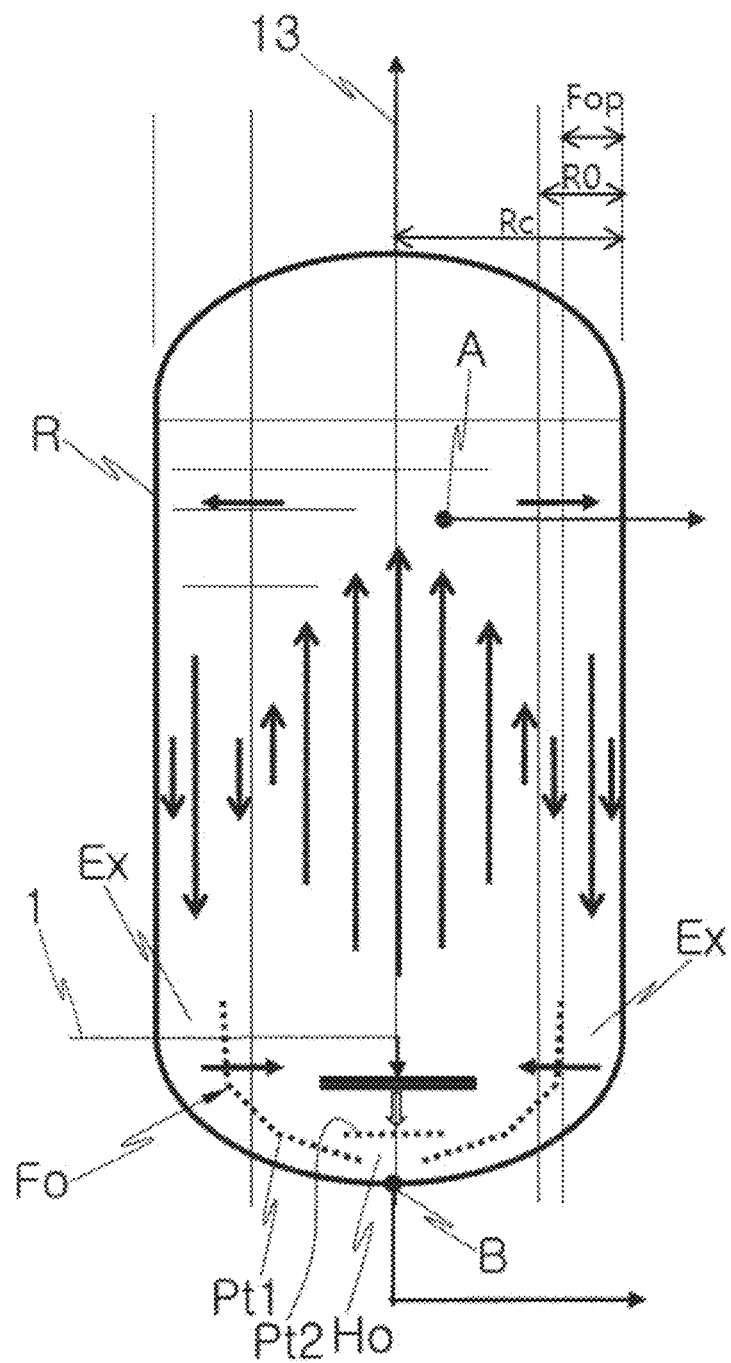
FIG. 3 is a view schematically illustrating a flow of a fluid inside the reactor according to the first exemplary embodiment of the present invention together with the reactor.
Figure 4:
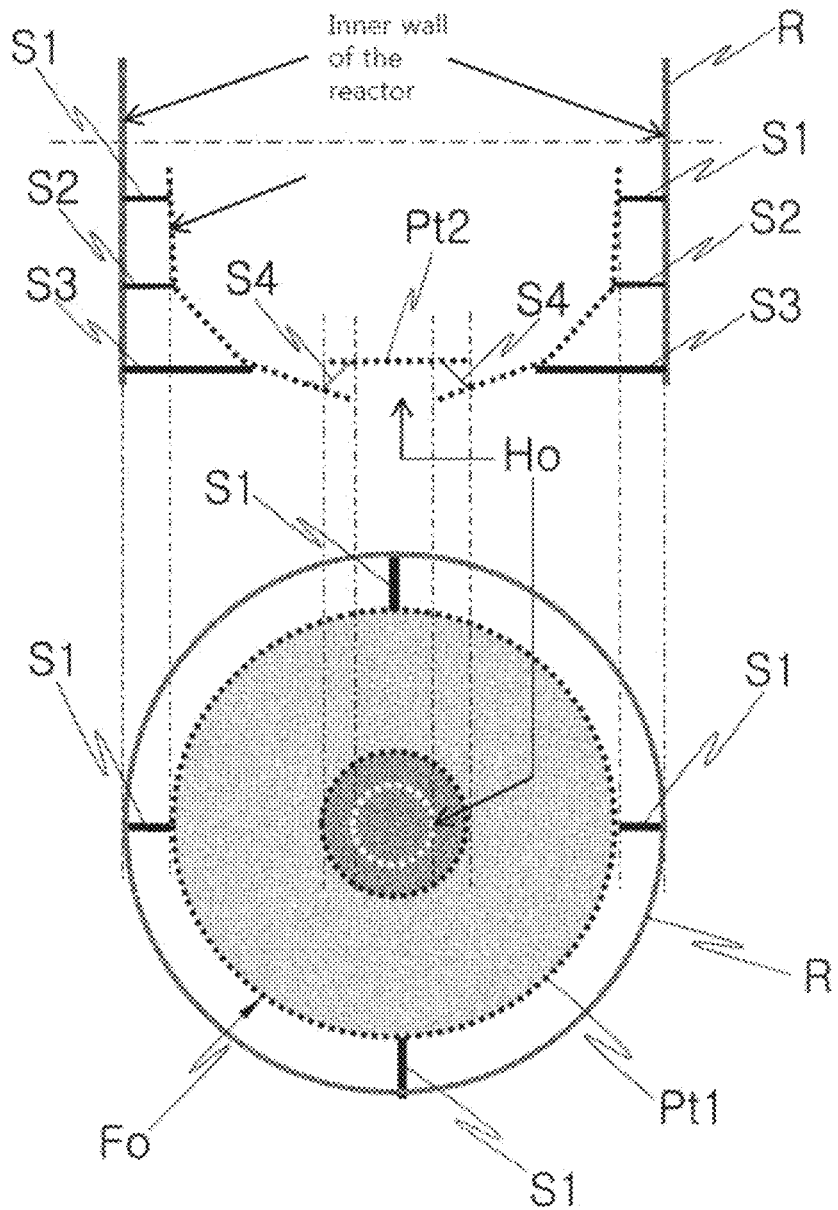
FIG. 4 is a view illustrating a structure of the internal filter inside the reactor according to the first exemplary embodiment of the present invention viewed from a side and a top side, respectively.

Accompanying FIG. 1 is a view illustrating installation of an internal filter F0 and external separating devices F1 and F2 inside a slurry phase reactor R1 of a reaction device according to a first exemplary embodiment of the present invention, FIG. 2 is a graph illustrating a result of a simulation regarding a velocity of gas bubbles and slurry inside a slurry phase reactor according to the present invention, FIG. 3 is a view schematically illustrating a flow of a fluid inside the reactor according to the first exemplary embodiment of the present invention together with the reactor, and FIG. 4 is a view illustrating a structure of the internal filter inside the reactor according to the first exemplary embodiment of the present invention viewed from a side and a top side, respectively.

A place for discharging slurry for separation of catalyst particles in a reactor R according to the first exemplary embodiment of the present invention is generally set at two sides of an upper side and a lower side, and external separating devices are installed at the two places so as to be connected with each other, and the external separating device connected to the lower side is expressed as a lower separating device F1, and the external separating device connected to the upper side is expressed as an upper separating device F2.

The lower separating device F1 is a place to which a slurry including an aggregated catalyst is discharged through a lower outlet B of the reactor R to be sent considering a flow of a fluid inside the reactor R, and when the lower separating device F1 is a filtration device, the lower separating device F1 may use a part of liquid hydrocarbon separated so as to prevent a filter from being plugged as a solvent, and a lower degasifier V1 is further installed at a line connecting the lower outlet B and the lower separating device F1.

Further, an upper outlet A is formed at a vicinity of a center of an upper portion of the reactor R, a tube or a sampling device through which the slurry may be extracted at the vicinity of the center of the upper portion of the reactor considering the flow of the fluid inside the reactor may be connected to the upper outlet A, and the slurry in which particles having an average size and a fine catalyst are mixed is discharged through the upper outlet A, so that the catalyst particles are circulated to the reactor while being filtered out and filtered liquid hydrocarbon is sent to a subsequent process, such as an upgrading unit.

Especially, the upper separating device F2 is connected to the upper outlet A, and when the upper separating device F2 installed outside is a filtration device, the filter may be plugged with fine particles, and thus the upper separating device F2 may use a part of the separated liquid hydrocarbon as a solvent, and a part of the liquid hydrocarbon containing a fine catalyst filtered one time or more may be discharged to the outside of the producing process, and an upper degasifier V2 is further installed at a line connecting the upper outlet A and the upper separating device F2.

The upper and lower external separating devices F2 and F1, that is, two types of external separating devices are not limited to the type, and a throughput and separation performance may be improved by connecting a plurality of external separating devices in parallel or in series if necessary as described in another exemplary embodiment to be described below.

Further, as illustrated in FIG. 1, the internal filter F0 inside the reactor R may be formed as a body portion pt1 having a shape of a concave container provided with a hole at the center of the lower end thereof to be installed in a form surrounding a synthesis gas distributor at a lower side, and like another exemplary embodiment to be described below, the internal filter F0 may use a scheme of covering the synthesis gas distributor D by forming the internal filter F0 in a convex, a quadrangular, or a flat shape without cover (Pt2). The convex shape filter and the box shape filter have no hole at the center thereof.

In this case, a slurry discharge path Ex for discharging the slurry to a space between an outer wall of the internal filter F0 and an inner wall of the reactor R is formed at the lower portion or a bottom of the reactor R.

In the meantime, a movement of internal bubbles and the slurry of the reactor R is recognized through a simulation, so that the upper outlet A which is a part for extracting liquid wax that is an intermediate product is formed at a predetermined position of the center of the upper portion of the reactor R, and the lower outlet B, which is a part for discharging the slurry including the aggregated catalyst lumps, is formed at a predetermined position of the center of the lower end of the reactor R.

Further, the internal filter F0 is installed in the lower portion inside the reactor R, so that the aggregated catalyst particles freely enter the slurry discharge path Ex that is an opened space between an external diameter of the internal filter F0 and the inner wall of the reactor R through a recirculation movement of the slurry to be discharged to the outside through the lower outlet B.

Further, flow of the slurry is distorted by an internal structure (a non illustrated tube for cooling and the like) of the reactor R, so that the aggregated catalyst may be dropped to the center of the lower portion of the reactor R, and the dropped aggregated catalyst may be induced so as to be naturally dropped to the lower outlet B through an inducing hole Ho formed at the center of the internal filter F0.

Further, a separate cover Pt2 is additionally disposed on the inducing hole Ho, and the cover Pt2 serves to confine a catalyst lump dropped to the center of the lower portion of the reactor R so as to prevent the catalyst lump dropped to the center of the lower portion of the reactor R from easily moving up to the center of the upper portion of the reactor R, so that the cover Pt2 is not essentially necessary, and it is allowed to operate the reactor in a state where the cover Pt2 is removed.

The recirculation movement of the slurry inside the reactor provided as described above is calculated by using "gProms simulator" that is a simulator of the Process Systems Enterprise Company, and a result thereof is represented in FIG. 2.

As noted in FIG. 2, it can be seen that the slurry and the bubbles inside the reactor are an upward flow up to about 75% point from the center of the reactor, and a velocity thereof is gradually decreased, and the slurry and the bubbles are changed to a downward flow in a space thereafter, and such a phenomenon is schematically illustrated in accompanying FIG. 3.

As illustrated in FIG. 3, when the internal filter F0 is installed at the lower portion inside the reactor R so that the closest distance Fop between the outer wall of the internal filter and the inner wall of the reactor is matched to a distance R0 in which a velocity of the fluid is 0, the lump generated according to the aggregation of the catalyst may easily flow in the slurry discharge path Ex having the distance Fop between the outer wall of the internal filter and the inner wall of the reactor by the recirculation movement, the lump entering the lower portion of the internal filter F0 cannot easily pass through pores of the filter to be prevented from entering the upper portion of the reactor R, and as a result, the lump is mostly discharged to the outside through the lower outlet B formed at the lower end of the reactor R.

Accompanying FIG. 4 is a view illustrating a structure of the internal filter inside the reactor according to the present invention viewed from a side and a top side, respectively, reference numeral Pt1 denotes the body portion of the internal filter F0, and reference numeral Pt2 denotes a cover portion.

The body portion Pt1 of the internal filter F0 is installed in a U-shape in which the inducing hole Ho passes through the center of the bottom while having a shape surrounding a lower portion and a side portion of the synthesis gas distributor D, and the cover Pt2 is disposed while being spaced apart from an upper side of the inducing hole Ho and disposed while being spaced apart from a lower surface of the synthesis gas distributor D1.

In this case, the body portion Pt1 is installed in a U-shape having a radius equal to or larger than 70% of a radius of the reactor inside the reactor R, and a distance between the inner wall of the reactor and the outer wall (external diameter) of the body portion Pt1 is within 30% of the radius of the reactor.

Further, the body portion Pt1 of the internal filter F0 is integrally connected with the inner wall of the reactor R to be supported by a plurality of support fixtures S1, S2, and S3, and the cover Pt2 is integrally connected with the body portion Pt1 to be supported by a support fixture S4.

The inducing hole Ho is formed at a center of a lower portion of the body portion Pt1, so that immediately when the aggregated catalyst enters a concave center of the body portion Pt1, the aggregated catalyst passes through a space between the body portion Pt1 and the cover Pt2 and is simultaneously discharged through the lower outlet B formed at the center of the lower end of the reactor through the inducing hole Ho.

Preferably, porosity of each of the body portion Pt1 and the cover Pt2 of the internal filter F0 is 30% or higher, a size of each pore of the filter is 1 mm or larger, the distance Fop between the outer wall of the internal filter and the inner wall of the reactor is within 30% of the radius of the reactor, the inducing hole Ho of the internal filter F0 has less than 100% of a diameter of the filter, and the cover Pt2 is installed at an interval of at least 1 mm from the body portion Pt1, in such a way that the cover Pt2 has an area capable of covering all of the area of the inducing hole Ho of the body portion Pt1.

In the meantime, the support fixtures S1 to S4 adopted for supporting the internal filter F0 in FIG. 4 are simply illustrated for helping the understanding of the present invention, and are not limited by a type, a shape, and a number, and are not limited by supporting positions thereof if performing at least a function of supporting the internal filter F0, but have a volume to the extent that the support fixtures S1 to S4 do not disrupt the floating of a reactant.

Here, a catalyst separation method using the reaction device of the present invention including the aforementioned configuration will be described below.

When synthesis gas for the F-T synthesis is supplied to the synthesis gas distributor D inside the reactor R through a synthesis supply line 1 and the synthesis gas inside the reactor R is simultaneously distributed in the synthesis gas distributor D, the synthesis gas is distributed in liquid hydrocarbon while becoming bubbles and is simultaneously mixed with catalyst particles, so that a slurry phase is obtained.

That is, in a case where a slurry reaction for the Fischer-Tropsch (F-T) synthesis using a catalyst from synthesis gas is performed, the synthesis gas having carbon monoxide and hydrogen as main components is reacted over a Fischer-Tropsch catalyst in the slurry reactor R to be produced as hydrocarbon, olefin, oxygenate and the like, and in this case, the synthesis gas is mixed with the liquid hydrocarbon and the catalyst particles within the reactor to be obtained as the slurry phase.

In this case, fine catalyst particles or the fragmented catalyst particles during operation is combined with the liquid hydrocarbon, co-produced water and the like in the slurry phase reactor R, so that a catalyst lump having an aggregated form is generated, and an aggregated catalyst lump is discharged in a form of a slurry.

More particularly, the internal filter F0 is installed at the lower portion inside the reactor R as described above, in such a way that the closest distance Fop between the outer wall of the internal filter and the inner wall of the reactor is matched to a distance R0 in which a velocity of the fluid is 0, so that the lump generated according to the aggregation of the catalyst may easily flow in the slurry discharge path Ex having the distance Fop between the outer wall of the internal filter and the inner wall of the reactor by the recirculation movement, and thus the lump entering the lower portion of the internal filter F0 cannot easily pass through pores of the filter to be prevented from entering the upper portion of the reactor R, and as a result, the lump is mostly discharged to the outside through the lower outlet B formed at the lower end of the reactor R.

Next, the slurry discharged through the lower outlet B of the reactor R is separated by the lower separating device F1 among the external separating devices after passing through the lower degasifier V1 so that the liquid (which has a small particle size) is recirculated to the reactor, and a part of retentate (which has a large particle size) is recirculated to the reactor or discharged to the outside after the processing.

More particularly, when the slurry discharged through the lower outlet B of the reactor R is sent to the lower separating device F1 among the external separating devices after passing through the lower degasifier V1, filtrate by the lower separating device F1 enters one or more vessels V3 along a filtrate discharge line 5 that is a recirculation means and then is recirculated to the reactor R, and together with this, a part of the retentate of the lower separating device F1 is recirculated to the reactor or is discharged to the outside so as to prevent the pores of the filter adopted as the lower separating device from being plugged.

In this case, the slurry sampled at the upper portion of the reactor R is discharged through the upper outlet A to be sent to the upper separating device F2 among the external separating devices after passing through the upper degasifier V2, the retentate passing through the external filter that is the upper separating device F2 and including the catalyst is sent to the vessel V3 through a retentate discharge line 11 that is the recirculation means to be recirculated to the reactor R, and the filtrate in which the catalyst particles are filtered is sent to a subsequent process, such as upgrading, capable of substantially obtaining hydrocarbon fuels through a filtrate discharge line 10.

That is, a pipe or a sampling device through which the slurry may be extracted is installed in the upper outlet A formed at the vicinity of the center of the upper portion of the reactor considering the flow of the fluid inside the reactor, so that when the slurry in which particles having an average size are mixed with the fine catalyst flows out through the sampling device, the catalyst particles are sent to the vessel V3 through the retentate discharge line 11 to be recirculated to the reactor R, and the filtrate in which the catalyst particles are filtered, that is, liquid hydrocarbon, is sent to the subsequent process, such as the upgrading unit, through the filtrate discharge line 10.

Here, second to seventh exemplary embodiments of the reacting device of the present invention will be described below.

Figure 5:
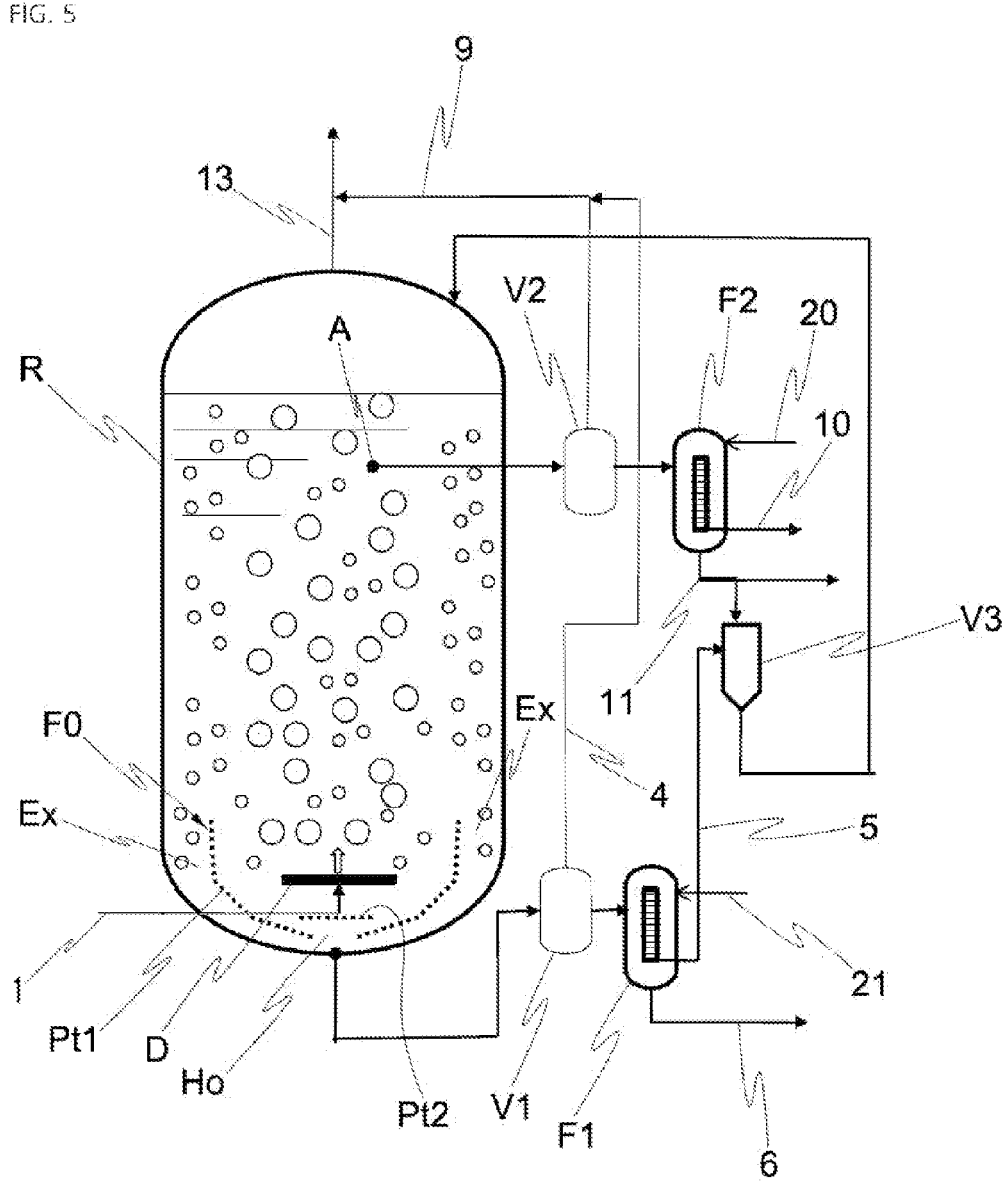
FIG. 5 is a view illustrating a reactor according to a second exemplary embodiment of the present invention, which has the same configuration as that of the first exemplary embodiment illustrated in FIG. 1, except that a direction of a synthesis gas distributor is opposite to a direction of a synthesis gas distributor of the first exemplary embodiment illustrated in FIG. 1.

As illustrated in FIG. 5, the reaction device according to the second exemplary embodiment of the present invention is manufactured with the same configuration as that of the first exemplary embodiment, except that a synthesis gas distribution direction of the synthesis gas distributor D is opposite to that of the first exemplary embodiment.

That is, in the reaction device according to the first exemplary embodiment, the synthesis gas supply line 1 is disposed above the synthesis gas distributor D, so that the synthesis gas distribution direction of the synthesis gas distributor D faces the bottom of the reactor (R), but in the reaction device according to the second exemplary embodiment, the synthesis gas supply line 1 is disposed under the synthesis gas distributor D, so that the synthesis gas distribution direction of the synthesis gas distributor D faces upwards.

The reaction device according to the third exemplary embodiment of the present invention is manufactured with the same configuration as that of the first exemplary embodiment, except that a plurality of upper separating devices among the external separating devices is serially connected.

Figure 6:
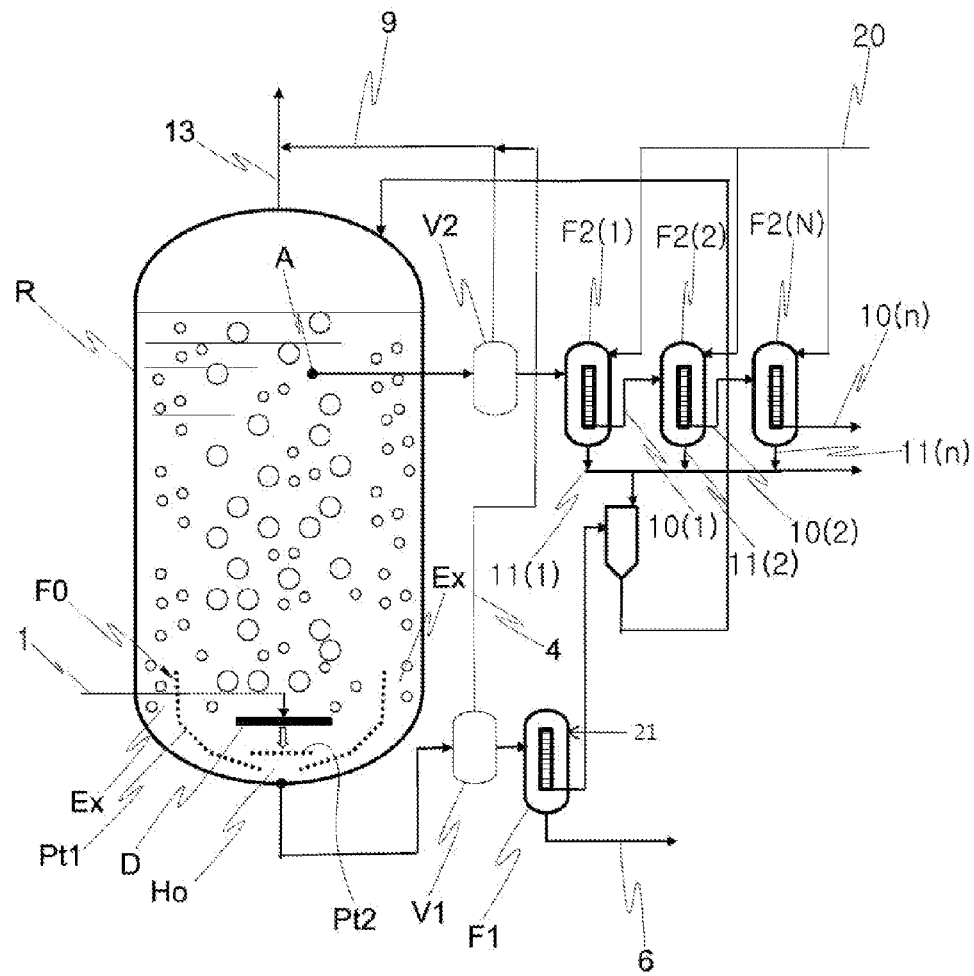
FIG. 6 is a view illustrating a reactor according to a third exemplary embodiment of the present invention, and illustrates an example in which a plurality of upper separating devices among external separating devices is serially connected.

More particularly, as illustrated in FIG. 6, in order to improve filtering performance, the plurality of filters F2(1), F2(2), . . . , and F2(n) (n is a positive integer equal to or larger than 2), which is the upper separating devices, is serially installed from the discharge line of the upper degasifier V2, in such a way that a size of the pores of the final filter is equal to or smaller than, for example, 10 μm by gradually decreasing sizes of the pores.

Accordingly, when the slurry is sampled through the tube installed at a space within 70% of the diameter from the center of the reactor, that is, the tube through which the slurry may be sampled to the outside, through the upper outlet A of the reactor R, the sampled slurry passes through the upper degasifier V2 and then sequentially passes through the plurality of upper separating devices F2(1), F2(2), and F2(n) which are the external filters, and reference numerals 10(1), 10(2), and 10(n) denote the filtrate discharge lines, and reference numerals 11(1), 11(2), 11(n) denote the retentate discharge lines in FIG. 6.

The reaction device according to the fourth exemplary embodiment of the present invention is the same as that of the third exemplary embodiment, and is characterized in that a plurality of lower separating devices is serially connected, in addition to the configuration that the plurality of upper separating devices is serially installed.

Figure 7:
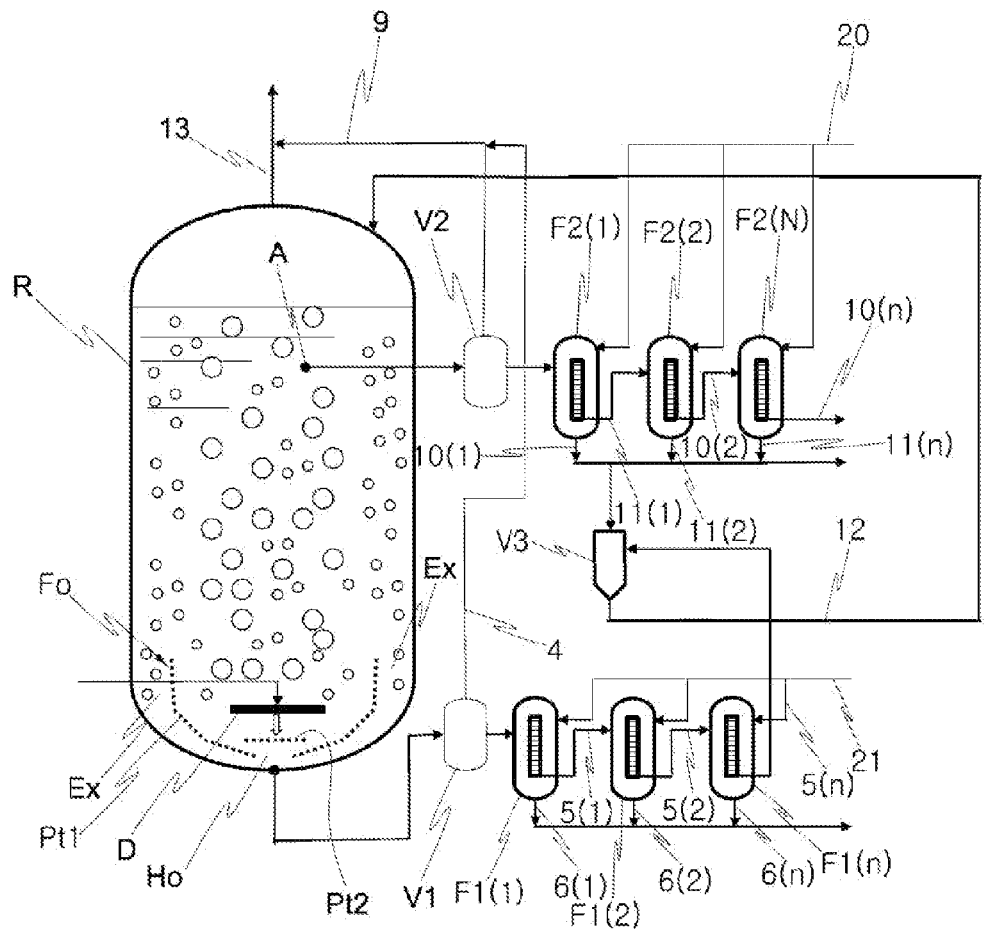
FIG. 7 is a view illustrating a reactor according to a fourth exemplary embodiment of the present invention, and illustrates an example in which all of a plurality of upper and lower separating devices, which is external separating devices, is serially connected.

More particularly, as illustrated in FIG. 7, in order to improve filtering performance, the plurality of filters F1(1), F1(2), . . . , and F1(n) (n is a positive integer equal to or larger than 2), which is the lower separating devices, is serially installed from the discharge line of the lower degasifier V1, in such a way that a size of the pores of the final filter is equal to or smaller than, for example, 300 μm by gradually decreasing a size of the pores.

Accordingly, the slurry discharged from the lower outlet B of the lower portion of the reactor R passes through the lower degasifier V1 and then sequentially passes through the plurality of lower separating devices F1(1), F1(2), and F1(n) which are the external filters, thereby improving performance of filtering the slurry.

In the meantime, a plurality of filters at the respective stages, which are the upper and lower separating devices F2 and F1, may be installed in parallel.

The reaction devices according to the fifth, sixth, and seventh exemplary embodiments of the present invention are characterized in that the shape of the internal filter and shape of the lower outlet are differently applied, respectively.

Figure 8:
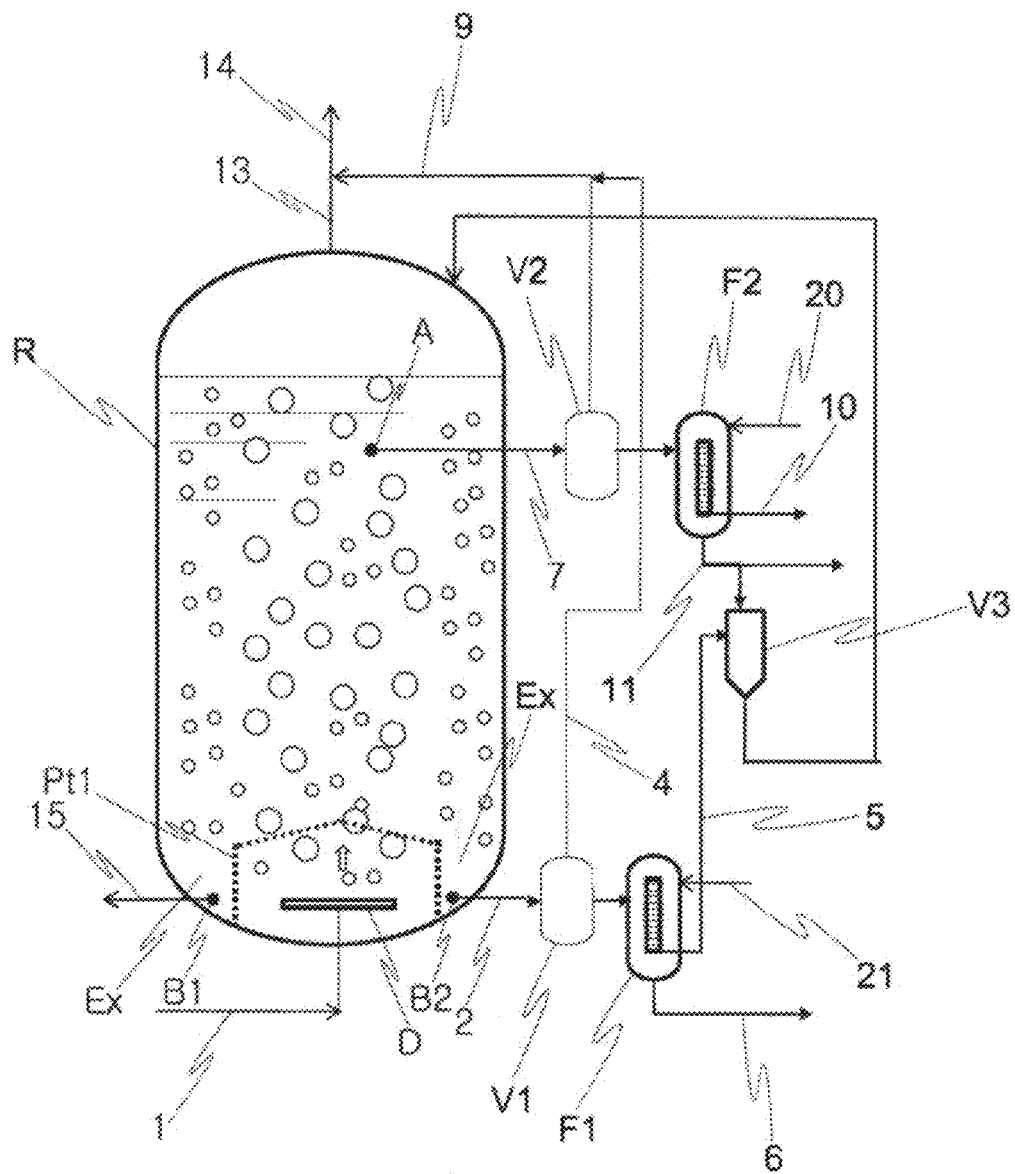
FIG. 8 is a view illustrating a reactor according to a fifth exemplary embodiment of the present invention, which has the same configuration as that of the second exemplary embodiment, except that an internal filter has a convex shape, the number of lower outlets in a lower portion of the reactor is plural, and a direction of a distributor is not limited.

As illustrated in FIG. 8, the reactor according to the fifth exemplary embodiment of the present invention is characterized in that the shape of the internal filter F0 is manufactured with an upwardly convex cross section structure to cover the synthesis gas distributor D from an upper side to a lower side, and a plurality of lower outlets B1 and B2 is formed at positions outside the internal filter F0.

Figure 9:
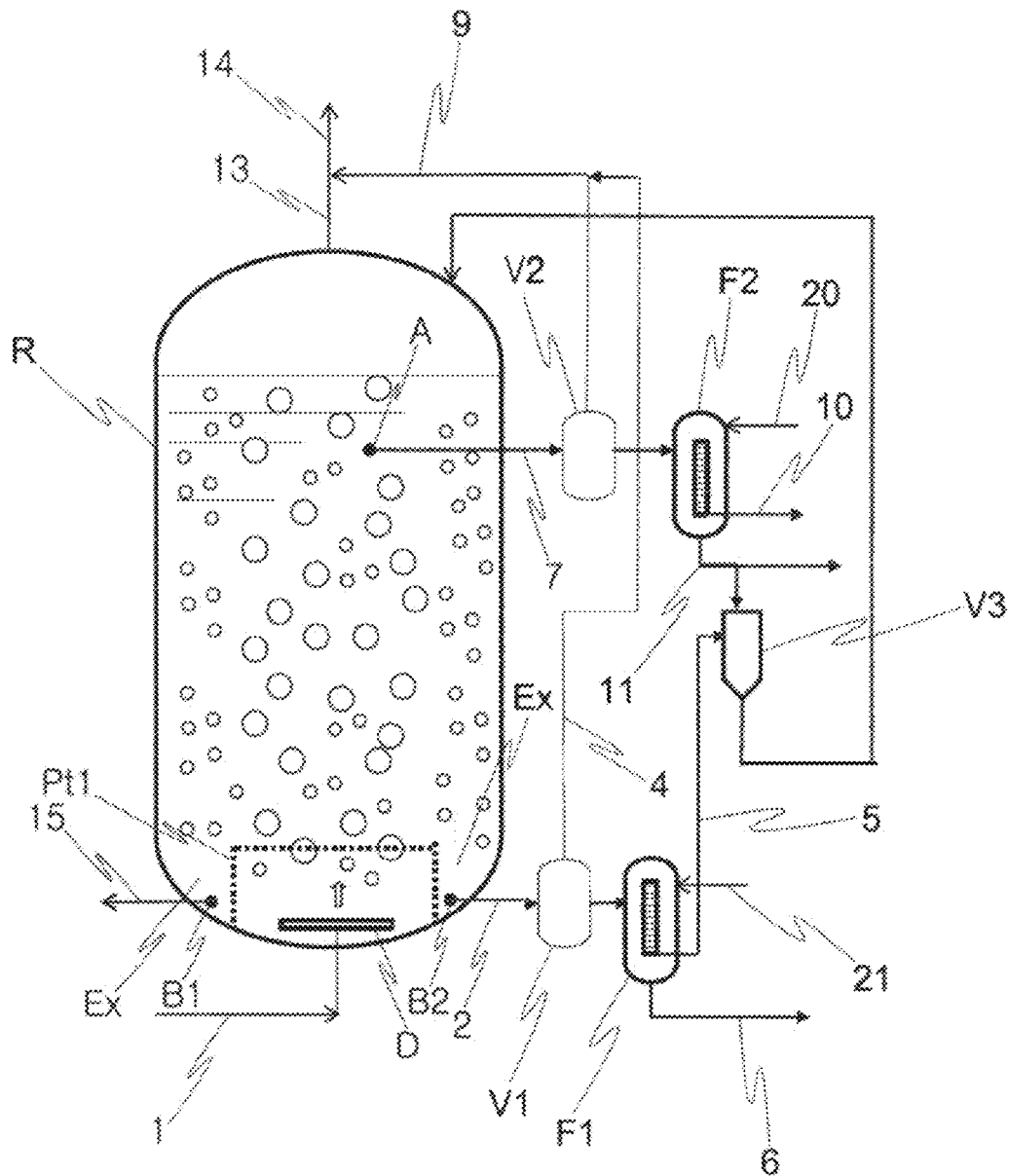
FIG. 9 is a view illustrating a reactor according to a sixth exemplary embodiment of the present invention, which has the same configuration as that of the fifth exemplary embodiment, except that an internal filter has a box shape, and a direction of a distributor is not limited.

The reactor according to the sixth exemplary embodiment of the present invention has the same configuration as that of the fifth exemplary embodiment, but is characterized in that as can be seen in FIG. 9, the shape of the internal filter adopts a rectangular box shape to be manufactured in a structure covering the synthesis gas distributor D from the upper side to the lower side, and the plurality of lower outlets B1 and B2 is formed at positions outside the internal filter F0.

The reactor according to the seventh exemplary embodiment of the present invention has the same configuration as that of the first exemplary embodiment, except for that the internal filter F0 of the reactor is manufactured in a shape of a flat plate (any type of shape, such as a circular shape, an elliptical shape, a star shape, and a quadrangular shape when viewed from an upper side, is available).

Figure 10:
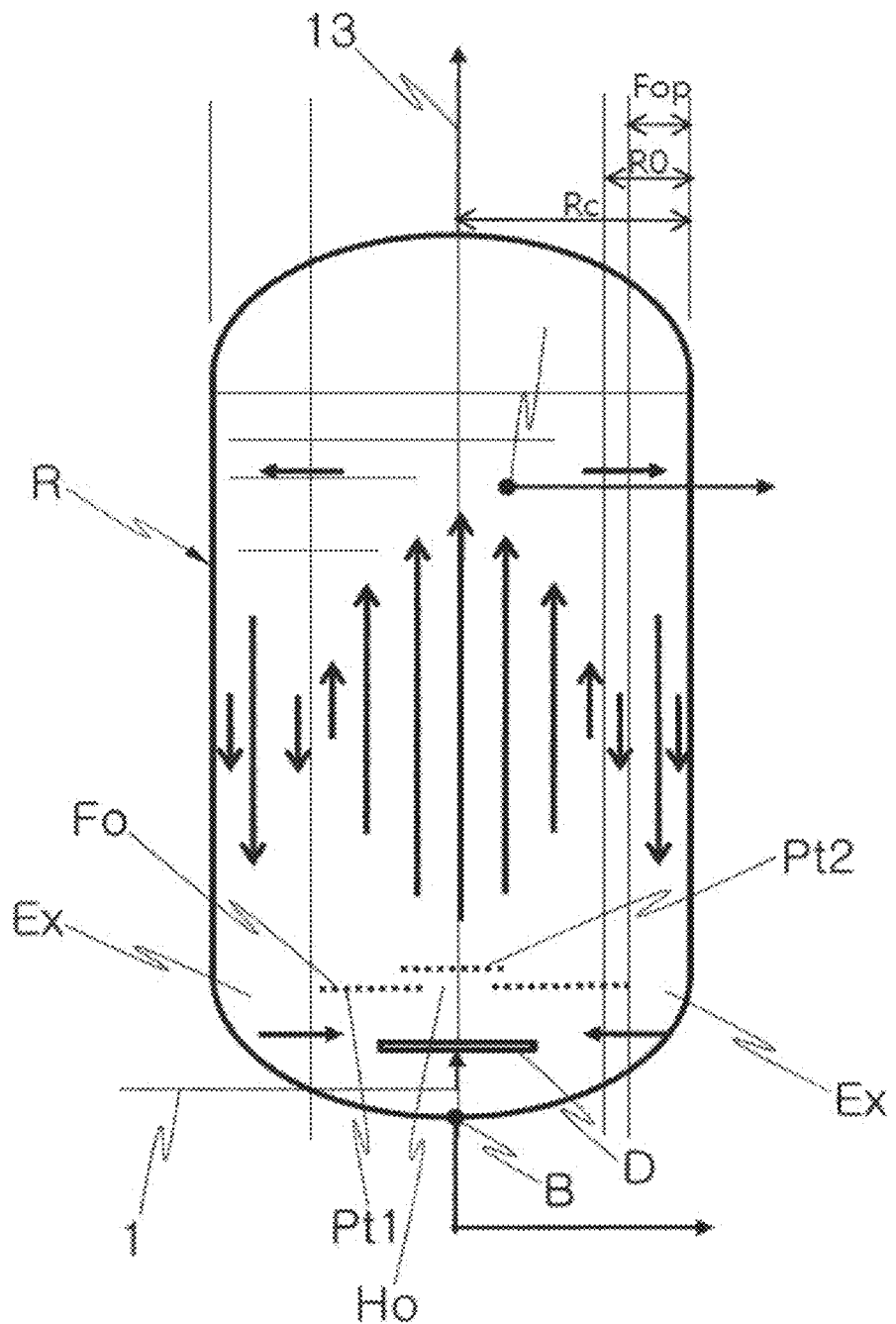
FIGS. 10 and 11 are views illustrating a reactor according to a seventh exemplary embodiment of the present invention, which has the same configuration as that of the first exemplary embodiment illustrated in FIGS. 3 and 4, respectively, except that an internal filter F0 of the reactor has a flat plate shape.
Figure 11:
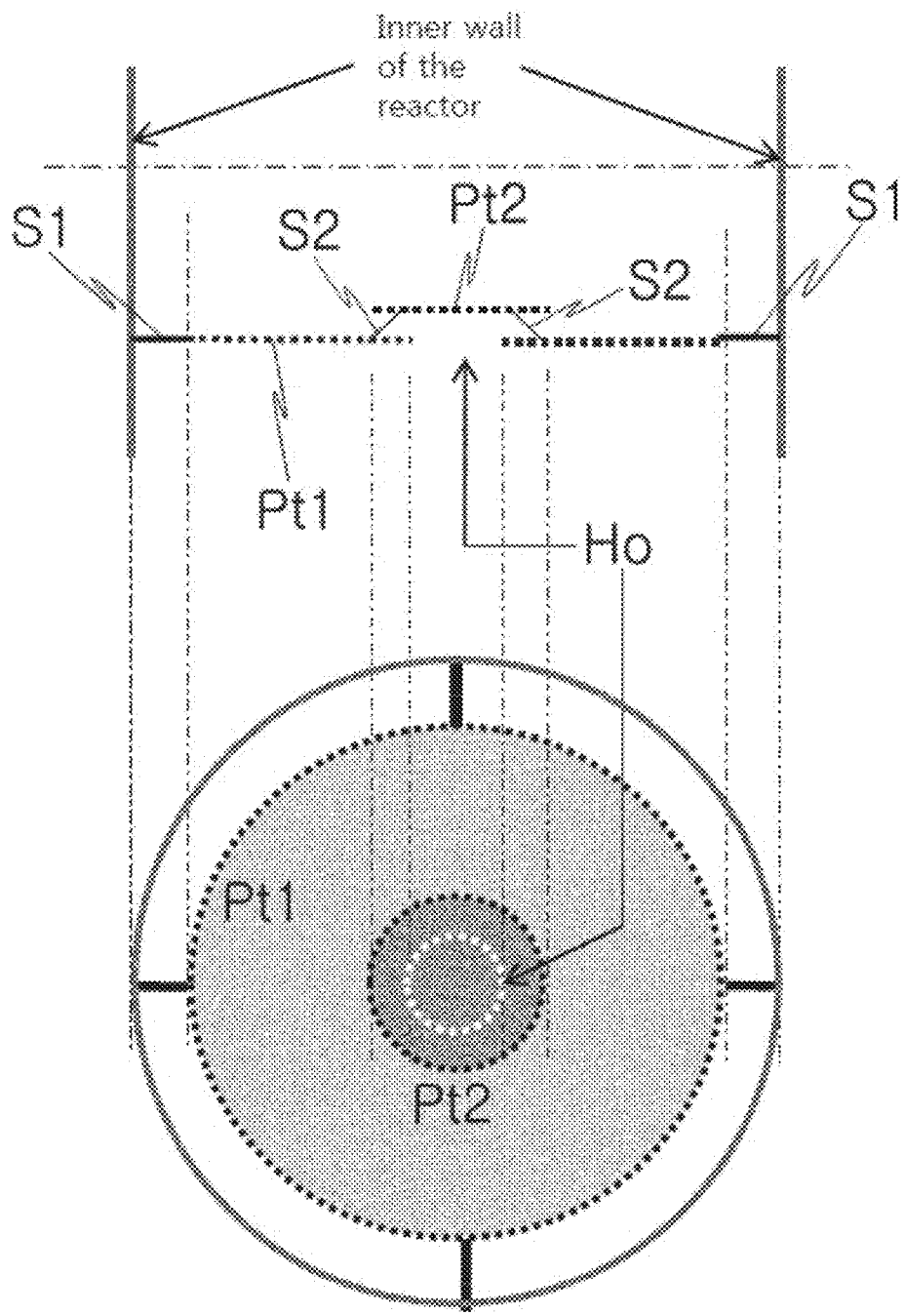

That is, as illustrated in accompanying FIGS. 10 and 11, the internal filter F0 according to the seventh exemplary embodiment includes the flat body portion Pt1 in which the inducing hole Ho passes through the center thereof and the cover Pt2 positioned above the inducing hole Ho of the body portion Pt1 while covering the inducing hole Ho of the body portion Pt1, and the body portion Pt1 is integrally connected with a wall surface of the reactor R by the support fixture S1 to be supported, and the cover Pt2 is integrally connected to the body portion Pt1 by the support fixture S2 to be supported.

In this case, the body portion Pt1 is installed as a plate shaped filter having a radius equal to or larger than 70% of the radius of the reactor inside the reactor R, and a distance between the inner wall of the reactor and the outer wall (or the external diameter) of the body portion Pt1 is within 30% of the radius of the reactor.

Non-described reference numerals 4, 9, and 13 in the respective exemplary embodiments of the present invention denote non-reacted gas discharge lines.

Further, in order to prevent the filter pores of the external filter adopted as the upper separating device in each exemplary embodiment from being plugged, a part of the filtered liquid may be discharged to the outside of the process through the retentate discharge line of the upper separating device indicated by reference numeral 11 and the retentate discharge line of the lower separating device indicated by reference numeral 6 in FIGS. 1, 5, 8, and 9.

Similarly, a part of the filtered liquid may be discharged to the outside of the process through the retentate discharge lines of the upper separating device indicated by reference numerals 11(1), 11(2), . . . , and 11(n) and the retentate discharge lines of the lower separating device indicated by reference numerals 6(1), 6(2), . . . , 6(n) in FIGS. 6 and 7.

In this case, a part of the retentate filtered in the upper separating device to be in a storage state flows in the vessel V3 through the retentate discharge lines 11, 11(1), 11(2), . . . , 11(n) of the upper separating device and then is recirculated to the reactor R, and the non-stored filtrate filtered in the upper separating device is directly discharged to the outside (a subsequent process, such as upgrading) through the filtrate discharge lines 10, 10(1), 10(2), . . . , and 10(n) of the upper separating device at the same time.

In the meantime, a part of the retentate filtered in the lower separating device to be in a storage state is recirculated to the reactor through the retentate discharge lines 6, 6(1), 6(2), . . . , 6(n) of the lower separating device and the remaining part thereof is discharged to the outside, and further, a part of the non-stored filtrate filtered in the lower separating device flows in the vessel V3 through the filtrate discharge lines 5, 5(1), 5(2), . . . , 5(n) of the lower separating device and then is recirculated to the reactor R.

In the meantime, another separating device capable of separating the particles may be applied to instead of the external filtering device adopted as the upper and lower separating devices F2 and F1, and for example, a centrifugal separator, a magnetic separator, a hydrocyclone, and the like may be applied thereto, and the type of device filtering or separating the particles is not limited.

If necessary, it is possible to remove the catalyst particles, hydrocarbon residue, and the like attached or stacked inside each separating device by injecting the liquid hydrocarbon solution to the upper and lower separating devices F2 and F1 through separate external injection lines indicated by reference numerals 20 and 21 in FIGS. 1 and 5 to 9.

EXPLANATION OF REFERENCE NUMERALS AND SYMBOLS

A: Upper outlet
B, B1, B2: Lower outlet
D: Synthesis gas distributor
Ex: Slurry discharge path
F0: Internal filter
F1, F1(1), F1(2), F1(n): Lower separating device
F2, F2(1), F2(2), F2(n): Upper separating device
Ho: Inducing hole
Pt1: Body portion
Pt2: Cover
R: Slurry phase reactor
S1, S2, S3, S4: Support fixture
V1: Lower degasifier
V2: Upper degasifier
V3: Vessel
1: Synthesis gas supply line
5, 5(1), 5(2), 5(n): Filtrate discharge line
6, 6(1), 6(2), 6(n): Retentate discharge line
10, 10(1), 10(2), 10(n): Filtrate discharge line
11, 11(1), 11(2), 11(n): Retentate discharge line
4, 9, 13: Non-reacted gas discharge line
20, 21: External injection line

The invention claimed is:

1. A reaction device for producing hydrocarbons from synthesis gas which includes a reactor (R) for reacting synthesis gas over a Fischer-Tropsch catalyst and a synthesis gas distributor (D) installed inside the reactor (R) to distribute synthesis gas, the reaction device comprising:
an internal filter (F0) installed inside the reactor (R);
a lower separating device (F1) connected with a lower outlet (B) formed at a bottom of the reactor (R) to filter or separate a slurry including a catalyst lump;
an upper separating device (F2) connected with an upper outlet (A) formed at a predetermined position at an upper side of the reactor (R) to filter or separate a slurry mixed with a fine catalyst;
a gas discharge means configured to discharge non-reacted gas generated inside the reactor (R);
a recirculation discharge means configured to recirculate or discharge the catalyst filtered in the upper and lower separating devices (F2 and F1); and
a slurry discharge path (Ex) formed between the internal filter (F0) and an inner wall of the reactor (R).

2. The reaction device of claim 1, wherein the internal filter (F0) is positioned above or under the synthesis gas distributor (D) inside the reactor (R), and has a shape of a concave vessel, is provided in a form in which an inducing hole (Ho) selectively passes through a center of a bottom of the internal filter (F0), and includes a body portion (Pt1) fixed through support fixtures (S1, S2, and S3) to the inner wall of the reactor (R).

3. The reaction device of claim 2, wherein the internal filter (F0) is spaced apart from and disposed above or under the inducing hole (Ho) of the body portion (Pt1), has an area larger than that of the inducing hole (Ho), and further includes a cover (Pt2) connected with the body portion (Pt1) through a support fixture (S4).

4. The reaction device of claim 1, wherein the internal filter (F0) is positioned above or under the synthesis gas distributor (D) inside the reactor (R), has a flat structure in which an inducing hole (Ho) selectively passes through a center thereof, and includes a body portion (Pt1) integrally connected to the inner wall of the reactor (R) through a support fixture (S1).

5. The reaction device of claim 4, wherein the internal filter (F0) is spaced apart from and disposed above or under the inducing hole (Ho) of the body portion (Pt1), has an area larger than that of the inducing hole (Ho), and further includes a cover (Pt2) connected with the body portion (Pt1) through a support fixture (S4).

6. The reaction device of claim 2, wherein a space between an external diameter of the body portion (Pt1) of the internal filter (F0) and the inner wall of the reactor (R) is formed as the slurry discharge path (Ex) so as to have smaller than 30% of a radius of the reactor (R).

7. The reaction device of claim 3, wherein a porosity of each of the body portion (Pt1) and the cover (Pt2) of the internal filter (F0) is 30% or more, and a size of each pore is 1 mm or more.

8. The reaction device of claim 1, wherein when a lower end of the internal filter (F0) is manufactured in a rectangular box shape integrally connected to the bottom of the reactor (R) and so as to entirely cover the synthesis gas distributor (D) inside the reactor (R), a plurality of lower outlets (B1 and B2) are formed at positions outside the internal filter (F0).

9. The reaction device of claim 1, wherein the lower separating device (F1) comprises a filter having a pore size of 300 μm or less.

10. The reaction device of claim 1, wherein the lower separating device (F1) comprises a plurality of serially connected filters (F1(1), F1(2), . . . , F1(n)) and size of pores of a finally disposed filter is 300 μm or less by gradually decreasing a size of pores of each filter.

11. The reaction device of claim 10, wherein a plurality of each of the plurality of serially connected filters (F1(1), F1(2), . . . , F1(n)) are connected in parallel.

12. The reaction device of claim 1, wherein the upper separating device (F2) comprises a filter having a pore size of 10 μm or less.

13. The reaction device of claim 1, wherein the upper separating device F2 comprises a plurality of serially connected filters (F2(1), F2(2), . . . , F2(n)) and a size of pores of a finally disposed filter is 10 μm or less by gradually decreasing a size of pores of each filter.

14. The reaction device of claim 13, wherein a plurality of each of the plurality of serially connected filters (F2(1), F2(2), . . . , F2(n)) are connected in parallel.

15. The reaction device of claim 1, wherein the upper separating device (F2) and the lower separating device (F1), each comprise a separator selected from the group consisting of a filter, a centrifugal separator, a magnetic separator, a hydrocyclone, a distiller, an evaporator capable of separating catalyst particles, and combinations thereof.

16. The reaction device of claim 1, wherein the gas discharge means comprises:
an upper degasifier (V2) installed between the upper outlet (A) and the upper separating device (F2) and the reactor (R) to discharge non-reacted gas to the outside; and
a lower degasifier (V1) installed between the lower outlet (B) and the lower separating device (F1) of the reactor (R) to discharge non-reacted gas to the outside.

17. The reaction device of claim 1, wherein the recirculation discharge means comprises:
a vessel (V3) configured to store catalyst particles filtered in the upper and lower separating devices (F2 and F1) and then send the stored catalyst particles to the reactor (R);
retentate discharge lines (11, 11(1), 11(2), 11(n)) connected between the upper separating device (F2) and the vessel (V3) to send a part of non-filtered retentate to the vessel (V3) and discharge the remaining part to the outside;
filtrate discharge lines (5(1), 5(2), 5(n)) connected between the lower separating device (F1) and the vessel (V3) to send filtered filtrate to the vessel (V3);
filtrate discharge lines (10, 10(1), 10(2), . . . , 10(n)) extending from the upper separating device (F2) in order to send the filtrate filtered in the upper separating device (F2) to a subsequent process; and
retentate discharge lines (11, 11(1), 11(2), 11(n)) extended from the lower separating device (F1) in order to recirculate a part of the retentate non-filtered in the lower separating device (F1) to the reactor and discharge the remaining part to the outside.

18. The reaction device of claim 1, wherein external injection lines (20 and 21) capable of injecting a liquid hydrocarbon solution are connected to the upper and lower separating devices (F2 and F1).

19. The reaction device of claim 1, wherein when a lower end of the internal filter (F0) is manufactured in a rectangular box shape in which an upper surface is an upwardly convex cross section structure and so as to entirely cover the synthesis gas distributor (D) inside the reactor (R), a plurality of lower outlets (B1 and B2) are formed at positions outside the internal filter (F0).

* * * * *